United States Patent

[11] 3,555,972

[72] Inventor Kenneth L. Hulsing
 Plymouth, Mich.
[21] Appl. No. 786,207
[22] Filed Dec. 23, 1968
[45] Patented Jan. 19, 1971
[73] Assignee General Motors Corporation
 Detroit, Mich.
 a corporation of Delaware

[54] CROSSHEAD PISTON
 3 Claims, 4 Drawing Figs.

[52] U.S. Cl. .................................................. 92/157,
 92/190, 123/193
[51] Int. Cl. ...................................................... F16j 1/14
[50] Field of Search ............................................ 92/160,
 189, 157, 158, 159, 187, 190, 188, 189; 123/193P

[56] References Cited
 UNITED STATES PATENTS

| | | | | |
|---|---|---|---|---|
| 1,554,157 | 9/1925 | Deans | | 92/190 |
| 1,787,119 | 12/1930 | Noble | | 92/190X |
| 1,865,793 | 7/1932 | Sawtelle | | 92/189 |
| 1,995,746 | 3/1935 | Nelson | | 92/160 |
| 2,069,594 | 2/1937 | Schneider | | 92/189X |
| 2,098,612 | 11/1937 | Bronson | | 92/160 |
| 2,372,050 | 3/1945 | Barraja-Frauenfelder | | 92/187X |
| 2,687,931 | 8/1954 | Flynn | | 92/187X |
| 2,889,182 | 6/1959 | Marshall | | 92/189X |
| 3,053,595 | 9/1962 | Dilworth | | 92/187 |
| 3,056,638 | 10/1962 | Houde | | 92/157 |
| 3,259,028 | 7/1966 | Hutto | | 92/158X |
| 3,448,664 | 6/1969 | Hulsing | | 92/157 |

Primary Examiner—Martin P. Schwadron
Assistant Examiner—Leslie J. Payne
Attorneys—J. L. Carpenter and Robert J. Outland ABSTRACT: In a preferred embodiment, a crosshead type piston for an internal combustion engine has a skirt member formed separately from the head member and both are independently connected with the piston pin. The head member carries the compression rings in a ring belt section integrally depending from the crown section, both of which are formed integrally with a piston pin receiving section. The latter section positively connects the head member to the piston pin and includes a saddle portion with a recess in load transmitting relationship with the piston pin so as to transfer downward combustion and inertia loads to a major portion of the piston pin upper surface. Oil distribution means provide for cooling the piston crown and lubricating the pin surfaces, and seal means between the head and skirt prevent excessive leakage of the cooling oil to the cylinder walls. A number of other features are included.

INVENTOR.
Kenneth L. Hulsing
BY
Robert J. Outland
ATTORNEY

CROSSHEAD PISTON

FIELD OF THE INVENTION

This invention relates to pistons primarily for use in internal combustion engines and more particularly to crosshead type pistons wherein the skirt is separate from the head and both are independently connected to the piston pin.

DESCRIPTION OF THE PRIOR ART

It is known in the art to provide an internal combustion engine with pistons in which the skirt and head portions are formed separately and independently connected to a piston pin. Many reasons have been advanced for the use of such piston constructions. In some cases, the purpose has been merely to permit the use of different materials in the head and skirt portions of the piston. In others, the advantage of a thermal barrier was asserted to prevent excessive distortion of the piston skirt through conduction of heat from the crown and ring belt area of the head.

In some prior art designs, various means were included to prevent substantial relative movement between the head and skirt members. In other designs, limited relative movement was permitted with the recognition that relieving the head of the side thrust forces which act upon the skirt, or crosshead, member permitted the head to accommodate itself better with the walls of the cylinders. The advantage of such accommodation does not appear to be a matter of record.

In spite of the reasons supposedly favoring their use, such crosshead pistons have not been generally used in commercial engines, possibly because of the added costs involved in their more complex construction and because piston requirements have been in the main adequately met by numerous other types of piston constructions. In addition, the prior art designs appear generally to have been inadequate for use in the high output engines of today and especially in diesel engines in which the severe combustion and inertia loads imposed upon the piston pin and its bearing have required substantially increased bearing areas for distribution of these loads over substantially the entire surface of the piston pin. Further, the prior art designs in which the head includes the crown and ring belt area and is relatively movable with respect to the skirt do not provide adequate sealing and other construction features to permit the use of oil cooling of the piston undercrown and adequate lubrication of the piston pin bearing surface as are necessary in many high output piston designs.

SUMMARY OF THE INVENTION

The present invention provides a crosshead piston construction including the prior art advantages of separate head and skirt members independently connected to a piston pin to provide for flexibility of their adjustment within the cylinder bore. With this arrangement, the combustion forces are absorbed completely by the head structure and transferred directly to the piston pin while the skirt accepts and transfers to the pin all of the side thrust forces. This separation of the members which respond to these different forces has proved to be of considerable significance when applied to pistons for use in high output engines since it reduces piston ring failures and scoring distress of the pistons and cylinders. One reason for this is believed to be a reduction of movement of the compression rings in their grooves in the head member due to the more stable lateral position this member may have within the engine cylinder. The improved reliability of pistons according to the invention is also believed attributable in part to the previously known advantages of reduced heat transfer between the head and the skirt.

This invention provides features of piston construction which permit application of of crosshead principle to pistons for high output engines. One of these features is the provision of a continuous saddle formed between the pin encircling arms of the head member to provide for the distribution of combustion loads over substantially the entire upper surface of the piston pin excluding that portion of the ends on which the skirt member is carried. Another feature is the provision for lubrication of the piston pin bearing surfaces and cooling of the piston undercrown by a substantial flow of oil through passages in the connecting rod, piston pin and saddle portions with provision of adequate sealing means for preventing leakage of the cooling oil onto the cylinder bore between the skirt and head members. Additional features provide for adequate drainage of the cooling and lubricating oil delivered to the piston as well as provision for the mounting of oil control rings in the lower portion of the skirt member. Still another feature is the provision for use of a replaceable bearing insert in the saddle portion of the head member and another is the connection of the saddle with the crown and ring belt sections of the head member by a plurality of radially and axially extending riblike columns or struts which provide a structure of adequate strength to transfer the combustion loads imposed on the crown while aiding in the transfer by conduction of heat away from the crown portion and permitting the distribution of cooling oil over the entire crown area. Yet another feature is the provision for use of a piston pin secured by bolting to the upper end of a connecting rod by means of a nut in a manner which may be used if desired to prestress the pin and which further leaves free the entire upper surface of the piston pin for receiving the distributed combustion loads transferred by the saddle portion of the piston head member.

These and other features and advantages of the invention will be more apparent from the following description of a preferred embodiment taken together with the accompanying drawing.

DESCRIPTION OF THE PREFERRED EMBODIMENT

Figure 1:
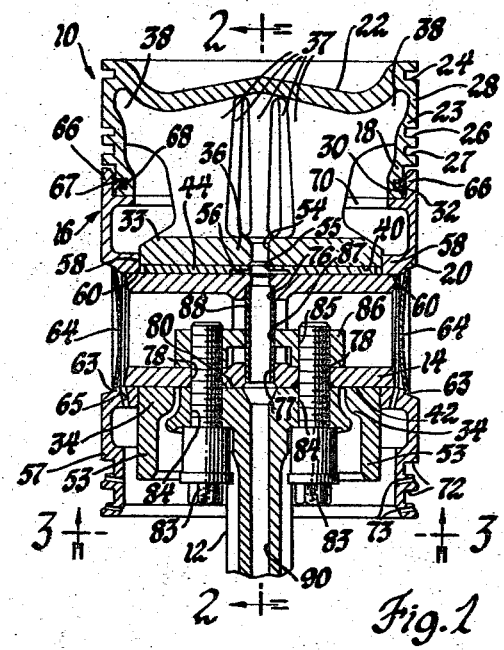
FIG. 1 is a cross-sectional view of a piston and connecting rod assembly formed according to the invention.

Referring now in detail to the drawing, numeral 10 generally indicates a preferred embodiment of piston-connecting rod assembly as disclosed in the various views of the drawing. Assembly 10 includes a connecting rod 12, the lower portion of which has been deleted to simplify the drawing, a piston pin 14 and a piston assembly generally indicated by numeral 16. The piston assembly includes two primary elements—a head member 18 and a skirt, or crosshead, member 20, both of which are integrally formed, preferably of cast iron.

The piston head member includes a crown section 22 extending over the upper surface and forming a combustion chamber defining wall. Depending from the outer edge of the crown section is an outer annular ring belt section 23 in which are formed three compression ring grooves including a top, or fire, ring groove 24 at the juncture of the crown and ring belt sections and second and third compression ring grooves 26 and 27 respectively located in a lower part of the ring belt section and separated from the top ring groove 24 by a thinner walled heat dam portion 28. Below the third ring groove 27, the ring belt section terminates in a reduced diameter portion 30 which includes a seal ring groove 32.

The piston head member further includes piston pin connecting section 33 generally comprising a pair of spaced downwardly extending pin encircling arms 34 interconnected at their upper ends by a saddle portion 36 which is in turn connected with the crown section by a plurality of axially and radially extending struts or columns 37. Columns 37 include radially outwardly extending rib portions 38 integrally connecting them with the ring belt section and with the outer portions of the crown section.

Saddle portion 36 defines a downwardly opening part cylindrical recess 40 coaxially aligned transversely of the piston axis with a pair of piston pin receiving openings 42 formed in pin encircling arms 34. Recess 40 terminates circumferentially in a pair of radial shoulders 43 which are adapted to retain in the recess a part cylindrical bearing insert 44 having an inwardly facing bearing surface preferably containing a plurality of grooves (not shown) for the distribution of lubricant thereover. A retainer tang 46 at one edge of insert 44 is deformably received in a recess 47 of the saddle portion to retain the insert from movement along its axis after installation. Between arms 34 and adjacent recess 40 the saddle portion is flared outwardly as at 48 and terminates in a depending rim 50. A pair of oil drain openings 52 are drilled vertically through the outwardly flared portion 48 for a purpose to be subsequently described. At the lower ends of arms 34, excess material 53 is provided which may be removed as desired in order to obtain the proper weight and balance of assembly. Cooling oil supply openings 54 and 55 are provided in the centers of the saddle portion and bearing insert respectively, the latter also having an arcuate recess 56 in its inner surface connecting with opening 55 and with oil distribution grooves (not shown) extending over the bearing surface.

The crosshead or skirt member 20 comprises generally a cylindrical wall 57 having a pair of centrally located oppositely disposed inwardly extending bosses 58 having cylindrical pin receiving openings 60 which, when the head member and skirt member are assembled, are coaxially aligned with the pin encircling openings 42 of the head member pin connecting section. The bosses 58 are interconnected circumferentially of the skirt by ribs 62. Short counterbores 63 are provided near the outer ends of the pin receiving openings 60 to receive metal closure plates 64 for a purpose to be subsequently described. Inwardly of counterbores 63 the bosses 58 are provided at their lower ends with oil drain openings 65.

At its upper end, the skirt has a slightly thickened annular wall portion 66 which, in assembly, surrounds the reduced diameter portion 30 of the head member ring belt section. A relatively small clearance is provided between them and this is sealed by suitable means such as metal seal ring 67 which includes overlapping ends to close the end gap. The seal ring is received in the ring groove 32 of the head member and is expanded by a conventional spring piston ring expander 68. An annular rib 70 extends around the skirt interior at the bottom of thickened portion 66 stiffening the upper skirt wall as well as serving to block the sloshing of cooling oil directly against the seal ring 67.

At its lower end, skirt member 20 includes two oil ring grooves 72 to provide for the application of suitable oil scraper rings for controlling the amount of oil on the engine cylinder walls. Below each groove 72 are a plurality of oil drain holes 73 to carry away oil from the oil rings in a conventional manner.

The head and skirt members of the piston assembly are retained together by the cylindrical piston pin 14 which is received in openings 60, 42 of the skirt and head members respectively and engages, across a substantial portion of the pin's upper surface, the bearing insert 44 retained within recess 40. Piston pin 14 is hollow, having a slightly thickened wall at its center where oppositely disposed upper and lower openings 76 and 77 respectively are provided. On opposite sides of lower opening 77, a pair of bolt clearance openings 78 are also provided.

The piston pin 14 is secured against the saddle portion 80 of the connecting rod 12 by means of bolts 83 which extend through openings 84 in the rod and openings 78 of the piston pin into engagement with threaded opening portions 85 of an elongated nut 86 disposed within the piston pin 14. If desired, the connecting rod and nut may be arranged in a known manner so as to prestress the pin by deforming it into an oval shape in its unloaded condition. Nut 86 also includes a central opening 87 which is aligned with openings 76 and 77 of the pin and together with them receives a tube member 88 for the purpose of providing a transverse oil passage through the pin. In assembly, the passage formed by tube 88 aligns with a drilled passage 90 extending lengthwise through the connecting rod 12.

In operation, oil is supplied from the engine lubricating oil system through drilled passage 90 of the connecting rod and tube 88 in the piston pin to recess 56 of the bearing insert, from which part of the oil is distributed over the surface of the insert through the distributing grooves (not shown) for lubricating the bearing surface. The majority of the oil supplied continues upward through openings 55 and 54 of the bearing insert and piston head saddle respectively and enters the undercrown cavity of the piston in which it is sloshed against the underside of the crown by the reciprocating motion of the piston. This action provides cooling to the crown, ring belt and connecting columnar ribs of the piston head structure. The oil is prevented from draining out of the cavity at an excessively high rate by cooperation of the saddle portion of the piston head with the bosses 58 and ribs 62 of the piston skirt, the latter of which fit closely around the depending rim 50 of the outwardly flared part of the saddle portion. Drain openings 52 provide for controlled drainage of cooling oil from the undercrown cavity.

Closure plates 64 prevent leakage of the oil, used to lubricate the pin, from the ends of the pin receiving openings and onto the piston skirt. Drain openings 65 provide for the return to the engine crankcase of any oil collecting at ends of the piston pin.

The fact that the piston head and skirt members are separately connected to the piston pin permits a small amount of relative motion between them so that movements of the piston skirt, caused by its natural motion from side to side in the cylinder liner as it absorbs the thrust loads placed upon the piston by oscillation of the connecting rod, are not transmitted to the piston head portion. Thus the head portion is subjected essentially only to the combustion and inertia forces which act along the axis of the engine cylinder. This permits the piston head to take a relatively fixed position within the engine cylinder and avoids unnecessary shifting and wear of the piston rings within the grooves. The axial combustion and downward inertia loads are distributed over substantially the entire upper surface of the piston pin by its contact with the insert bearing received within the part cylindrical recess of the piston saddle portion. These features combine to provide a high capacity piston construction capable of operating under high temperatures with high loads and providing excellent conditions for extended operation of the skirt and head portions as well as the piston pin bearing.

Figure 2:
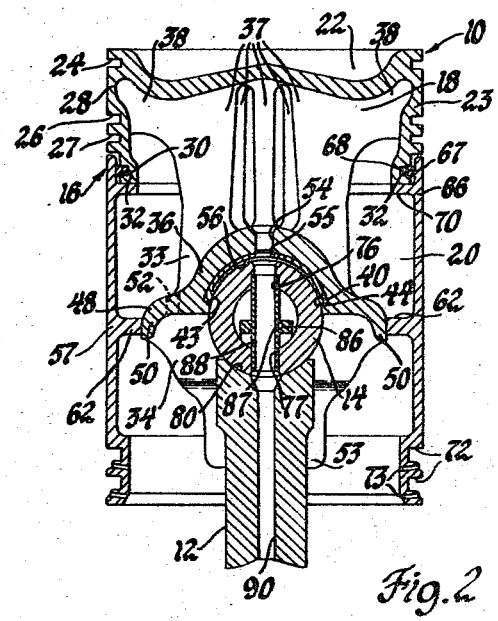
FIG. 2 is a different cross-sectional view taken generally in the plane indicated by the line 2—2 of FIG. 1 as viewed in the direction of the arrows.
Figure 3:
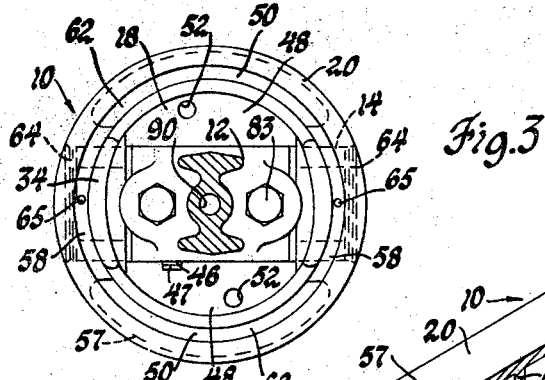
FIG. 3 is a view of the underside of the piston connecting rod assembly of FIGS. 1 and 2 showing the connecting rod in cross section as viewed from the plane indicated by the line 3—3 of FIG. 1.
Figure 4:
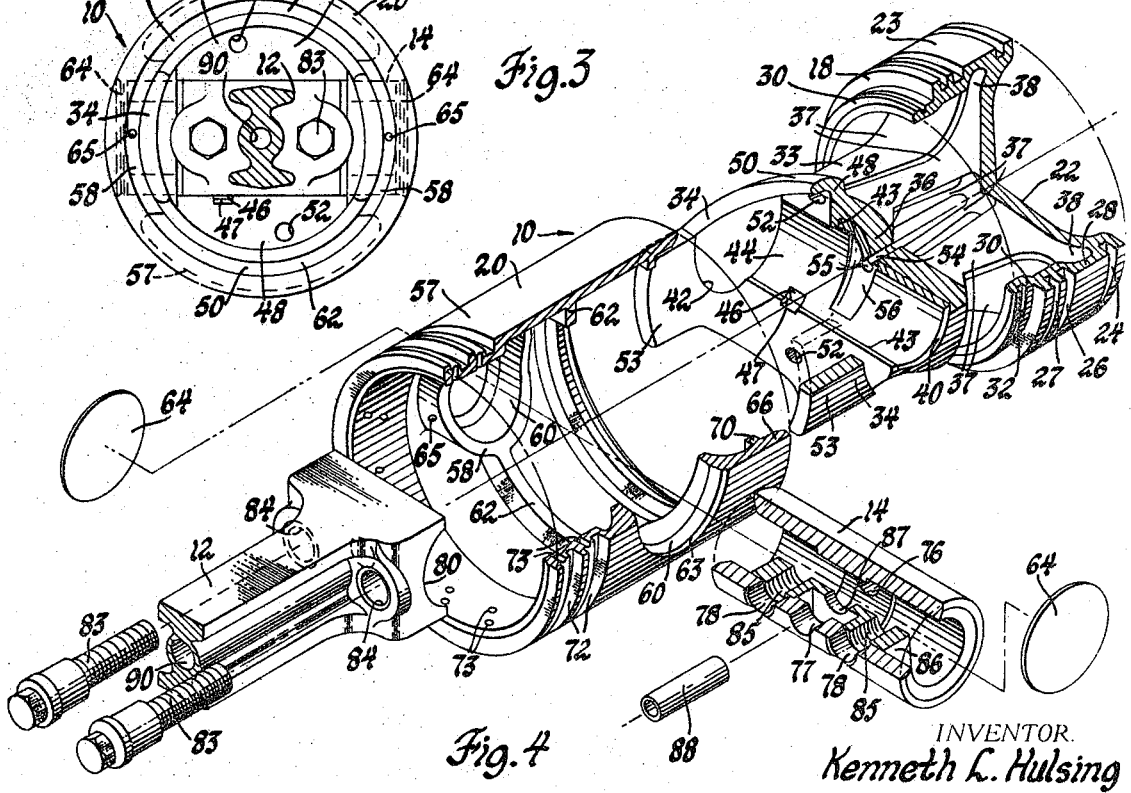
FIG. 4 is a pictorial view showing the various components of the disclosed piston-connecting rod assembly and indicating their relative assembly positions.

The use in the specification and claims of terms such as "top and bottom," "upper and lower" "vertical and horizontal" and the like in the description of the location or action of components of the disclosed piston embodiment are intended only to indicate the relative locations of the components as they are shown in FIGS. 1 and 2 of the drawing and are in no way intended to suggest that the piston embodiment described, or other pistons formed according to the invention, may not be used in suitable positions other than those shown in the drawing. While the invention has been described by reference to one specific preferred embodiment, it should be apparent that numerous changes and modifications could be made in the many details of construction and arrangements of the various members without departing from the spirit and scope of the invention as disclosed.

I claim:

1. An oil cooled crosshead type piston assembly for a an internal combustion engine, said assembly comprising:
    a head member having a crown section integrally formed with an outer ring belt section and an inner piston pin connecting section, both depending from said crown section, said piston pin connecting section including a saddle portion having a centrally disposed opening to permit the passage of cooling oil into the crown and ring belt sections, a downwardly facing cylindrical recess for receiving and transmitting loads to a piston pin and a pair of piston pin receiving arms extending downwardly from opposite ends of said saddle portion, said arms having opposed pin encircling openings disposed coaxially with said recess;

a separately formed skirt member including a generally cylindrical wall extending downwardly from adjacent said ring belt section, said skirt member having a pair of oppositely disposed bosses extending inwardly of said wall and having pin receiving openings extending therethrough and aligned with the pin encircling openings in said head member arms so as to receive a piston pin for retaining said head and skirt portions in assembly;

said skirt member being closely fitted with the saddle portion of said pin connecting section so as to control oil drainage from the piston undercrown cavity;

said head member having an annular reduced diameter portion of said ring belt section which is received internally of the upper end of said skirt cylindrical wall to form inner and outer concentric portions having respectively inner and outer opposed cylindrical surfaces;

a seal groove in one of said concentric portions and opening through one of said surfaces; and a seal ring in said groove and engaging the other of said surfaces so as to prevent excessive leakage of cooling oil between said head and skirt members from the interior to the exterior of said piston assembly.

2. The piston assembly of claim 1 and further comprising an annular rib extending inwardly from said skirt cylindrical wall and immediately beneath the reduced diameter portion of said head member ring belt section, said rib acting both to stiffen the upper skirt wall and to block cooling oil from sloshing directly against the seal ring.

3. The piston assembly of claim 1 wherein said skirt cylindrical wall has on its outer periphery and below said seal ring groove, an oil ring groove for receiving an a oil ring to control lubrication of the associated cylinder wall, said seal ring being effective to prevent excessive oil from bypassing the oil ring through the interior of the piston skirt.